(12) United States Patent
Oizumi et al.

(10) Patent No.: US 6,721,897 B1
(45) Date of Patent: Apr. 13, 2004

(54) BUS CONTROL CIRCUIT EFFECTING TIMING CONTROL USING CYCLE REGISTERS FOR RESPECTIVE CYCLES HOLDING SIGNAL LEVELS CORRESPONDING TO BUS CONTROL SIGNALS THAT ARE OUTPUT BY ARRANGEMENT OF SIGNAL LEVEL

(75) Inventors: Akira Oizumi, Tokyo (JP); Norio Masui, Tokyo (JP); Yukihiko Shimazu, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 607 days.

(21) Appl. No.: 09/735,496

(22) Filed: Dec. 14, 2000

(30) Foreign Application Priority Data

Jun. 6, 2000 (JP) ........................................ 2000-169462

(51) Int. Cl.⁷ .............................. G06F 5/06; G06F 5/00
(52) U.S. Cl. ...................... 713/600; 713/500; 713/502; 710/15; 710/100; 710/305
(58) Field of Search ................................. 713/500, 502, 713/600; 710/15, 100, 305

(56) References Cited

U.S. PATENT DOCUMENTS

| 5,828,857 | A | * | 10/1998 | Scalise | 713/600 |
| 6,070,205 | A | * | 5/2000 | Kato et al. | 710/100 |
| 6,490,638 | B1 | * | 12/2002 | Ha et al. | 710/15 |

FOREIGN PATENT DOCUMENTS

| DE | 3731340 A1 | * | 3/1989 | .......... H04L/11/12 |
| JP | 57-133741 A | | 8/1982 | |
| JP | 64-68154 A | | 3/1989 | |
| JP | 2-85951 A | | 3/1990 | |
| JP | 2-280263 A | | 11/1990 | |
| JP | 3-52350 A | | 3/1991 | |
| JP | 7-502614 T | | 3/1995 | |
| JP | 8-292928 A | | 11/1996 | |

OTHER PUBLICATIONS

Knapp, S.; Tavana, D.; "Field configurable system–on–chip device architecture", Custom Integrated Circuits Conference, 2000. CICC. Proceedings of the IEEE 2000, May 21–24, 2000, Page(s): 155–158.*

* cited by examiner

Primary Examiner—Thomas Lee
Assistant Examiner—James K. Trujillo
(74) Attorney, Agent, or Firm—Burns, Doane, Swecker & Mathis, L.L.P.

(57) ABSTRACT

A bus control circuit includes cycle registers provided with areas for holding signal levels of system-to-external bus control signals such that each of the cycle registers is provided for a corresponding cycle. A default register, additionally included in the bus control circuit, holds signal levels of the system-to-external bus control signals in a normal state. The signal levels of the system-to-external bus control signals held in the corresponding areas in the cycle registers are output cycle by cycle. When the normal state takes over, the signal levels held in the corresponding areas in the default register are output.

9 Claims, 9 Drawing Sheets

BUS CONTROL CIRCUIT EFFECTING TIMING CONTROL USING CYCLE REGISTERS FOR RESPECTIVE CYCLES HOLDING SIGNAL LEVELS CORRESPONDING TO BUS CONTROL SIGNALS THAT ARE OUTPUT BY ARRANGEMENT OF SIGNAL LEVEL

BACKGROUND OF THE INVENTION

1. Field of the Invention

The present invention generally relates to bus control circuits for controlling an input and output bus (system-to-external bus) in a semiconductor device such as a microprocessor or a semiconductor memory device fabricated in the form of an IC chip and, more particularly, to a bus control circuit adapted to a variety of types of system-to-external bus protocol control.

2. Description of the Related Art

FIG. 18 is a block diagram showing a construction of a data processing system in which a bus control circuit according to the related art is used. The data processing system comprises a microprocessor 1, an external device 2, a system-to-external bus 3, a CPU unit 11, a memory unit 12, a system-to-external bus control unit 13 according to the related art, an address bus 21, a data bus 22, a control signal line 23, a SEL signal line 23a, an RS signal line 23b and a WS signal line 23c.

A description will now be given of the operation according to the related art.

The microprocessor 1 communicating with the external device 2 via the system-to-external bus 3 is required to adapt to a variety of system-to-external bus control protocols depending on the type of the external device 2 connected via the system-to-external bus 3. In order to meet the requirement, the system-to-external bus control unit 13 adapted to the target type of system-to-external bus control is designed for each external device 2 connected to the microprocessor 1. Using the system-to-external bus control unit 13 thus designed, an entire set of system-to-external bus control signals including a SEL signal, an RS signal and a WS signal are generated for respective cycles of a system-to-external communication period (N cycle) so that the signals are output to the SEL signal line 23a, the RS signal line 23b and the WS signal line 23c, respectively.

The control of the system-to-external bus 3 is described in various publications. Japanese Laid-Open Patent Application No. 8-292928, Japanese Laid-Open Patent Application 2-280263 and Japanese Laid-Open Patent Application No. 2-85951 disclose a type of control adapted to idle clocks used in communication with the external device 2. Japanese Laid-Open Patent Application No. 3-52350, Japanese Laid-Open Patent Application No. 64-68154 disclose a type of control adapted to a specific communications protocol. Japanese Laid-Open Patent Application No. 57-133741 and Published Japanese Translation of PCT International publication for Patent Application No. 7-502614 disclose a type of control adapted to synchronous communication.

The microprocessor 1 used with the system-to-external bus control unit of the related art as described above must be designed to adapt to a type of protocol required for the external device 2 connected to the microprocessor 1 via the system-to-external bus 3. If the type of control exercised via the system-to-external bus 3 differs, the microprocessor 1 should be redesigned accordingly to adapt to the protocol required for the external device 2. Accordingly, there is a disadvantage in that an extensive period of time is required for redesign. Moreover, the merit of using the microprocessor 1 as a general-purpose semiconductor device is lost and the production cost is increased by having to prepare a variety of products.

SUMMARY OF THE INVENTION

Accordingly, a general object of the present invention is to provide a bus control circuit in which the aforementioned disadvantages are eliminated.

Another and more specific object is to provide a bus control circuit capable of generating system-to-external bus control signals in a programmable manner in response to a variety of requirements in system-to-external bus control.

The aforementioned objects can be achieved by a bus control circuit for use in a semiconductor device communicating with an external device via a system-to-external bus, for effecting timing control of the system-to-external bus, comprising: cycle registers provided for respective cycles that occur during communication with the system-to-external bus and provided with signal level areas for holding signal levels of respective system-to-external bus control signals; and a default register provided with normal level areas each holding a signal level of the corresponding system-to-external bus control signal in a normal state, wherein the signal levels of the system-to-external bus control signals held in the corresponding signal level areas in the cycle registers are output according to a predetermined schedule demanded by an arrangement of the signal level areas, and the signal levels of the system-to-external bus control signals held in the corresponding normal level areas in the default register are output when the normal state takes over.

Each of the signal level areas in the corresponding cycle register may hold the signal level of the system-to-external bus control signal in one cycle, and the signal levels of the system-to-external bus control signals held in the corresponding signal level areas in the cycle registers may be output cycle by cycle during the communication.

Each of the signal level areas in the corresponding cycle register may hold the signal level of the system-to-external bus control signal in a half cycle, and the signal levels of the system-to-external bus control signals held in the corresponding signal level areas in the cycle registers may be output half cycle by half cycle during the communication.

Two cycle registers may be provided for each cycle that occurs during the communication, the signal level areas in one of the two cycle registers holding the signal levels in a first half cycle and the signal level areas in the other of the two cycle registers holding the signal levels in a second half cycle.

In each of the cycle registers responsible for respective cycles, two signal level areas may be provided to correspond to the corresponding system-to-external bus control signal, one of the two signal level areas holding the signal level in a first half cycle and the other of the two signal level areas holding the signal level in a second half cycle.

The bus control circuit may further comprise a control register for holding information for controlling timing of output from the cycle registers, wherein the signal levels held in the corresponding signal level areas in the cycle registers are output in accordance with the information held in the control register.

A delay information area for holding delay information specifying a delay to be imposed on the corresponding signal level may be provided for each of the signal level areas in the corresponding cycle register, so that each of the signal levels of the corresponding system-to-external bus control signal held in the corresponding signal level area is delayed, before being output, in accordance with the delay information held in the corresponding delay information area.

Each of the cycle registers may be provided with an instruction field for holding an instruction specifying a method of output of the corresponding signal levels, so that the signal levels of the system-to-external bus control signals held in the signal level areas in the corresponding cycle register are output in accordance with the method of output specified by the instruction held in the instruction field.

Each of the cycle registers and the default register may be provided with undefined signal areas for holding the signal levels of undefined general-purpose signals, so that the signal levels of the general purpose signals held in the undefined signal areas are output in addition to the signal levels of the system-to-external bus control signals held in the signal level areas.

BRIEF DESCRIPTION OF THE DRAWINGS

Other objects and further features of the present invention will be apparent from the following detailed description when read in conjunction with the accompanying drawings, in which.

DETAILED DESCRIPTION OF THE PREFERRED EMBODIMENTS

First Embodiment

Figure 1:
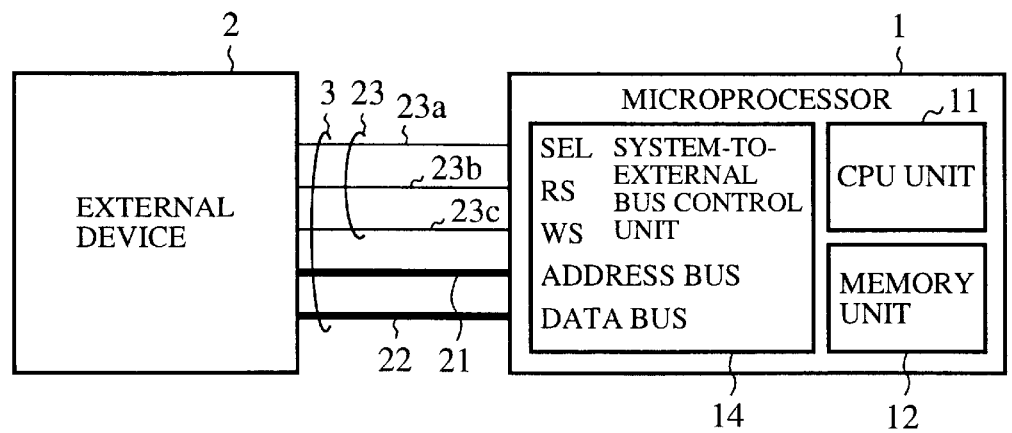
FIG. 1 is a block diagram showing a data processing system in which a bus control circuit according to the invention is used.

FIG. 1 is a block diagram showing a construction of a data processing system in which a bus control circuit of the invention is used. Referring to FIG. 1; the data processing system comprises a microprocessor 1 implemented by an IC chip or the like; an external device 2 adapted to a predetermined protocol and connected to the microprocessor 1; a system-to-external bus 3 for connecting the microprocessor 1 to the external device 2; a CPU unit 11 inside the microprocessor 1; and a memory unit 12 such as a RAM inside the microprocessor 1.

Figure 18:
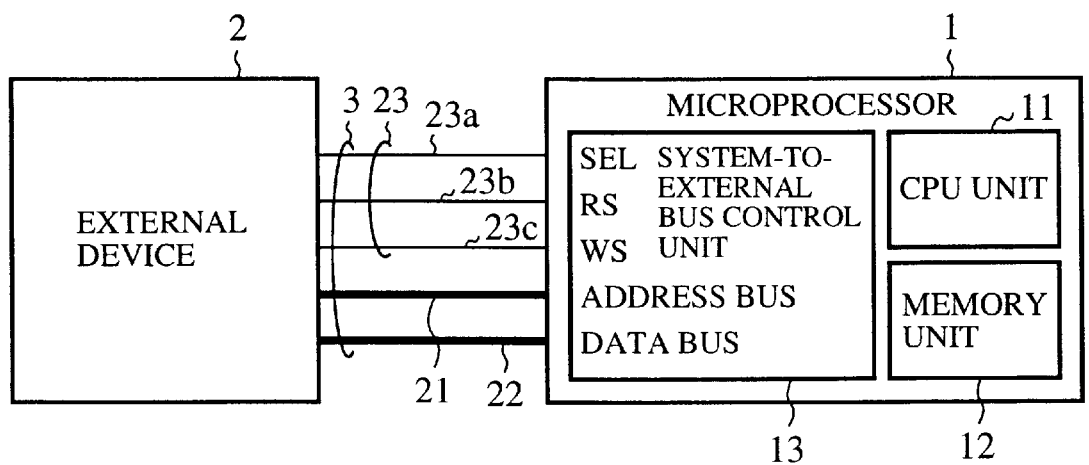
FIG. 18 is a block diagram showing a construction of a data processing system in which a bus control circuit according to the related art is used.

The system-to-external bus 3 comprises: an address bus 21 for transferring addresses between the microprocessor 1 and the external device 2; a data bus 22 for transferring data between the microprocessor 1 ad the external device 2; and a set of control signal lines 23 for transferring system-to-external bus control signals. The set of control signal lines 23 includes a SEL signal line 3a for transferring a SEL signal, an RS signal line 23b for transferring an RS signal and a WS signal line 23c for transferring a WS signal. The components listed above are equivalent to the corresponding components indicated by the same reference numerals in FIG. 18.

The microprocessor 1 according to the invention includes a system-to-external bus control unit 14. The system-to-external bus control unit 14 differs from the system-to-external bus control unit 13 of FIG. 18 in that it is programmable to adapt to a variety of requests in system-to-external bus control, by modifying information stored in an internal register when exchanging data with the external device 2 via the system-to-external bus 3.

Figure 2:
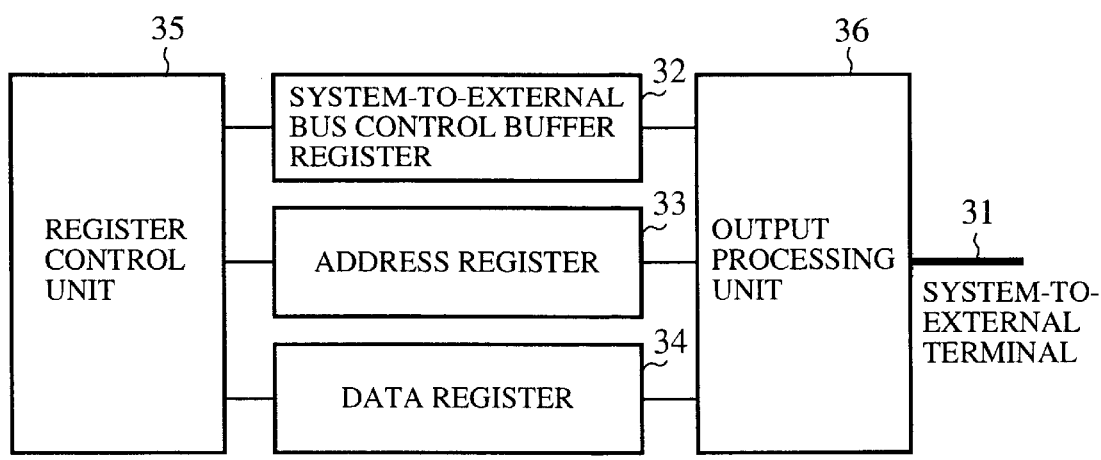
FIG. 2 is a block diagram showing a construction of a system-to-external bus control unit according to t invention.

FIG. 2 is a block diagram showing a construction of the system-to-external bus control unit 14 according to the invention. Referring to FIG. 2, the system-to-external bus control unit 14 comprises: a system-to-external terminal 31 for inputting and outputting data from and to the system-to-external bus 3; a system-to-external bus control buffer register 32; an address register 33; a data register 34; a register control unit 35 for controlling the system-to-external bus control buffer register 32, the address register 33 and the data register 34 so as to input and output data from and to the system-to-external bus 3 via the system-to-external terminal 31. The system-to-external bus control unit 14 further comprises an output processing unit 36 for outputting data from the system-to-external bus control buffer register 32, the address register 33 and the data register 34 to the system-to-external bus 3.

A description will now be given of the operation according to the first embodiment.

The system-to-external bus control buffer register 32 holds, for each cycle, a level of a system-to-external bus control signal required to control the system-to-external bus 3. The address register 33 holds an address exchanged with the external device 2. The data register 34 hods data exchanged with the external device 2. The register control unit 35, the system-to-external bus control buffer register 32, the address register 33 and the data register 34 operate to input and output data from and to the external device 2 via the system-to-external terminal 31.

Figure 3:
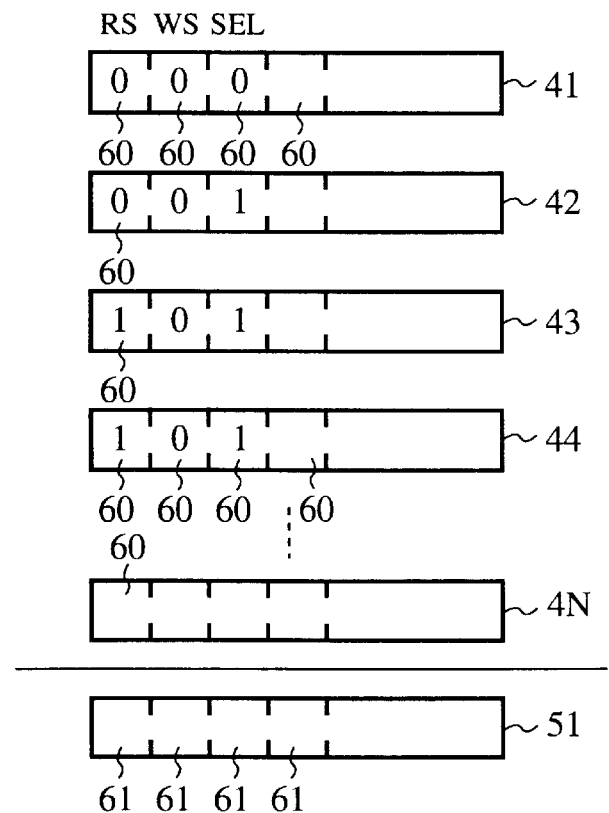
FIG. 3 is a block diagram showing a construction of a system-to-external control buffer register of a bus control circuit according to a first embodiment of the present invention.
Figure 4:
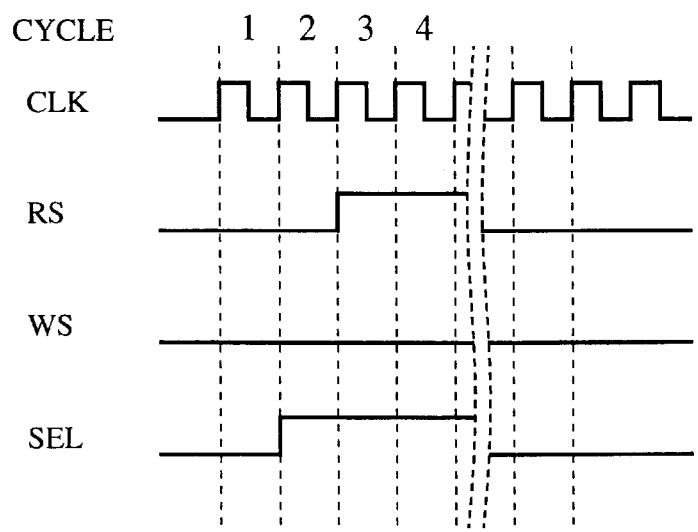
FIG. 4 is a timing chart showing variations in system-to-external bus control signals according to the first embodiment.

A description will now be given, with reference to FIGS. 3 and 4, of how the control of the system-to-external bus 3 is timed pursuant to a protocol required by the external device 2 connected via the system-to-external bus 3. FIG. 3 is a block diagram showing a construction of a system-to-external control buffer register of a bus control circuit according to the first embodiment. FIG. 4 is a timing chart showing variations in system-to-external bus control signals according to the first embodiment.

Referring to FIG. 3, the system-to-external bus control buffer register 32 comprises: a cycle register 41 for holding a level of the system-to-external bus control signal in a first cycle of a system-to-external bus communication period (bus cycles); a cycle register 42 for holding a level of the system-to-external control signal in a second cycle of the bus cycles; a cycle register 43 for holding a level of the system-to-external control signal in a third cycle of the bus cycles; . . . ; and a cycle register 4N for holding a level of the system-to-external control signal in an Nth cycle of the bus cycles. The cycle registers are provided for each of the cycles 1-N of the system-to-external bus communication period occurring on the system-to-external bus 3. There is further provided a default register 51 for holding a level of the system-to-external bus control signal in a normal state. More specifically, the default register holds the level of a disable signal. Thus, the system-to-external bus control buffer register 32 is formed of a total of N+1 registers.

Reference numeral 60 indicates an area provided in each of the registers 41-4N for holding the level of the corresponding signal. Each of the areas 60 of the cycle registers 41-4N holds the level of the system-to-external bus control signal for the corresponding cycle. Reference numeral 61 indicates an area provided in the default register 51. More specifically, the area 61 holds the disable level of the corresponding system-to-external bus control signal in a normal state. The contents of the areas 60 and 61 are rewritable in accordance with the protocol required for the external device 2 connected via the system-to-external bus 3.

It is assumed that the areas 60 in the cycle register 41 corresponding to the RS signal, the WS signal, the SEL signal, . . . , in the first cycle hold "0, 0, 0, . . . ", respectively; the areas 60 in the cycle register 42 corresponding to the RS signal, the WS signal, the SEL signal, . . . in the second cycle hold "0, 0, 1, . . . ", respectively; the areas 60 in the cycle register 43 corresponding to the RS signal, the WS signal, the SEL signal, . . . in the third cycle hold "1, 0, 1, . . . ", respectively; the areas 60 in the cycle register 44 corresponding to the RS signal, the WS signal, the SEL signal, . . . in the fourth cycle hold "1, 0, 1, . . . ", respectively; and the areas 60 in the cycle register 4N for the Nth cycle hold respective levels, in accordance with the protocol required for the connected external device 2. The area 61 in the default register 51 holds the level of the disable signal level for the corresponding signal-to-external bus control signal in a normal state.

As shown in FIG. 4, the levels of the RS signal, the WS signal and the SEL signal held in the respective areas 60 in the cycle register 41 are read out in the first cycle and output from the output processing unit 36 to the RS signal line 23b, the WS signal line 23c, the SEL signal line 23a, . . . constituting the set of control signal line 23 via the system-to-external terminal 31. As a result of this, the RS signal line 23b is brought to "0" level (in the illustration, low level); the WS signal line 23c is brought to "0" level; and the SEL signal line 23a is brought to "0" level.

Likewise, in the second cycle, as a result of reading out the levels from the areas 60 in the cycle register 42, the RS signal line 23b of the set of control signal lines 23 is brought to "0" level; the WS signal line 23c is brought to "1" level (in the illustration, high level); and the SEL signal line 23a is brought to "1" level. In the third cycle, as a result of reading out the levels from the areas 60 in the cycle register 43, the RS signal line 23b is brought to "1" level; the WS signal line 23c is brought to "0" level; and the SEL signal line 23a is brought to "1" level. In the fourth cycle, as a result of reading out the levels from the areas 60 in the cycle register 44, the RS signal line 23b is brought to "1" level; the WS signal line 23c is brought to "0" level; and the SEL signal line 23a is brought to "1" level.

Thus, the contents of the areas 60 of the cycle registers 4l-4N of the system-to-external bus control buffer register 32 are output from the output processing unit 36 to the RS signal line 23b, the WS signal line 23c, the SEL signal line 23 . . . via the system-to-external terminal 31 at a rising edge of the clock, in synchronization with a clock CLK for each cycle. After the Nth cycle, the disable levels stored in the area 61 in the default register 51 are respectively output from the output processing unit 36 to the RS signal line 23b, the WS signal line 23c, the SEL signal line 23 . . . via the system-to-external terminal 31.

Thus, the level of the system-to-external bus control signal output to the set of control signal lines 23 is programmed in accordance with the protocol required for the external device 2 connected to the microprocessor 1 via the system-to-external bus 3, by rewriting signal levels stored in the corresponding area 60 in the corresponding one of the cycle registers 4l-4N. The bus control circuit as described herein may be implemented either by hardware or software.

As described, according to the first embodiment, the system-to-external bus control signal adapted for the protocol required for the external device 2 connected via the system-to-external bus 3 is generated by rewriting the signal level stored in the corresponding area 60 in the corresponding one of the cycle registers 4l-4N.

Second Embodiment

Figure 5:
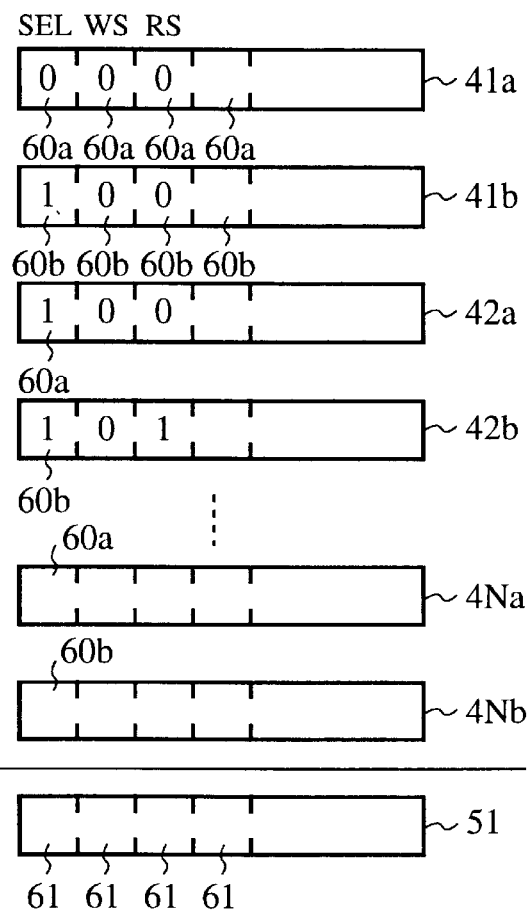
FIG. 5 is a block diagram showing a construction of a system-to-external bus control buffer register of a bus control circuit according to a second embodiment of the present invention.
Figure 6:
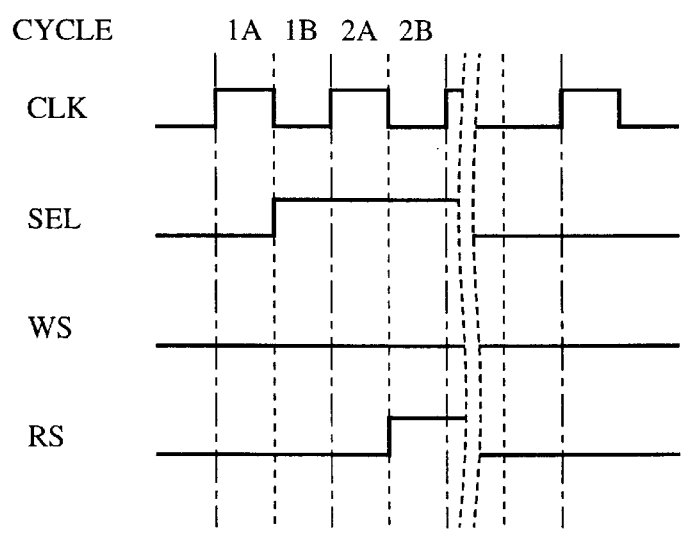
FIG. 6 is a timing chart showing variations in system-to-external bus control signals according the second embodiment.

The signal level of the system-to-external control signal for each cycle is stored in the corresponding area in the cycle register, according to the first embodiment. Alternatively, the signal level for each half-cycle may be stored in the corresponding area in the cycle register. FIG. 5 is a block diagram showing a construction of a system-to-external bus control buffer register of a bus control circuit according to a second embodiment of the present invention. FIG. 6 is a timing chart showing variations in system-to-external bus control signals according to the second embodiment.

Referring to FIG. 5, the system-to-external bus control buffer register 32 according to the second embodiment comprises: a cycle register 41a for holding a level of the system-to-external bus control signal in a first half-cycle of a first cycle of the bus cycles; a cycle register 41b for holding a level of the system-to-external control signal in a second half cycle of the first cycle of the bus cycles; a cycle register 42a for holding a level of the system-to-external control signal in a first half cycle of a second cycle of the bus cycles; a cycle register 42b for holding a level of the system-to-external control signal in a second half cycle of the second cycle of the bus cycles; . . . ; a cycle register 4Na for holding a level of the system-to-external control signal in a first half cycle of an Nth cycle of the bus cycles; and a cycle register 4Nb for holding a level of the system-to-external control signal in a second half cycle of the Nth cycle of the bus cycles.

Reference numeral 60a indicates an area provided in each of the registers 41a, 42a, . . . 4Na for holding the level of the corresponding signal in the corresponding first half cycle. Reference numeral 60b indicates an area provided in each of the registers 41b, 42b, . . . 4Nb for holding the level of the corresponding signal in the corresponding second half cycle. The cycle registers 41a, 41b, 42a, . . . 4Nb are provided such that two registers are provided for each of the cycles 1-N occurring on the system-to-external bus 3.

The default register 51 according to the second embodiment and the area 61 therein are equivalent to the corresponding components according to the first embodiment indicated by the same numerals in FIG. 3. Thus, the system-to-external bus control buffer register 32 is formed of a total of 2N+1 registers.

A description will now be given of the operation according to the second embodiment.

It is assumed that the areas 60a in the cycle register 41a corresponding to the SEL signal, the WS signal, the RS signal in the first half cycle of the first cycle of the bus cycles hold "0, 0, 0, . . . ", respectively; the areas 60b in the cycle register 41b corresponding to the SEL signal, the WS signal, the RS signal, . . . in the second half cycle of the first cycle of the bus cycles hold "1, 0, 0, . . . ", respectively; the areas 60a in the cycle register 42a corresponding to the SEL signal, the WS signal, the RS signal, . . . in the first half cycle of the second cycle of the bus cycles hold "1, 0, 0, . . . ", respectively; the areas 60b in the cycle register 42b corresponding to the SEL signal, the WS signal, the RS signal, . . . in the second half cycle of the second cycle of the bus cycles hold "1, 0, 1, . . . ", respectively; . . . and the areas 60b in the cycle register 4Nb for the second half cycle of the Nth cycle of the bus cycles hold respective levels, in accordance with the protocol required for the connected external device 2. The area 61 in the default register 51 holds the disable signal level for the corresponding signal-to-external bus control signal in a normal state.

As shown in FIG. 6, the levels of the SEL signal, the WS signal, the RS signal, . . . in the first half cycle held in the respective areas 60a in the cycle register 41a are read out in cycle 1A at the rising edge of the clock CLK and output from the output processing unit 36 to the SEL signal line 23a, the WS signal line 23c, the RS signal line 23b, . . . constituting the set of control signal line 23 via the system-to-external terminal 31. As a result of this, the SEL signal line 23a is brought to "0" level; the WS signal line 23c is brought to "0" level; and the RS signal line 23b is brought to "0" level. Likewise, in cycle 1B, as a result of reading out the levels of the SEL signal, the WS signal, the RS signal, . . . in the second half cycle from the areas 60b in the cycle register 41b at the falling edge of the clock CLK and outputting the levels thus read out from the output processing unit 36 to the SEL signal line 23a, the WS signal line 23c, the RS signal line 23b, . . . constituting the set of control signal line 23 via the system-to-external terminal 31, the SEL signal line 23a is brought to "1" level; the WS signal line 23c is brought to "0" level; and the RS signal line 23b is brought to "0" level.

Likewise, in cycle 2A, as a result of reading out the levels in the first half cycle of the second cycle from the areas 60a in the cycle register 42a at the rising edge of the clock CLK, the SEL signal line 23a is brought to "1" level; the WS signal line 23c is brought to "0" level; and the RS signal line 23b is brought to "0" level. In cycle 2B, as a result of reading out the levels in the second half cycle of the second cycle from the areas 60b in the cycle register 42b at the falling edge of the clock CLK, the SEL signal line 23a is brought to "1" level; the WS signal line 23c is brought to "0" level; and the RS signal line 23b is brought to "1" level.

Thus, for each of the cycles 1A–NB, the contents of the areas 60a of the cycle registers 41a, 42a, . . . 4Na are read out at the rising edge of the clock CLK and the contents of the areas 60b of the cycle registers 41b, 42b, . . . 4Nb are read out at the falling edge of the clock CLK. The contents (signal levels) thus read out are output from the output processing unit 36 to the corresponding ones of the SEL signal line 23a, the WS signal line 23c, the RS signal line 23b, . . . , via the system-to-external terminal 31. Thus, the signal levels of the system-to-external control signals in the first half cycle of each cycle are output to the set of control signal lines 23 at the rising edge of the clock CLK; and the signal levels of the system-to-external control signals in the second half cycle of each cycle are output to the set of control signal lines 23 at the falling edge of the clock CLK. After the NBth cycle, the signal levels stored in the areas 61 in the default register 51 are respectively output from the output-processing unit 36 to the SEL signal line 23a, the WS signal line 23c, the RS signal line 23b, . . . , via the system-to-external terminal 31.

As described, according to the second embodiment, the system-to-external bus control signals are output at the rising edge and the falling edge of the clock CLK, using the cycle registers 4la–4Nb having a similar construction as the cycle registers 4l–4N of the first embodiment. Thus, the bus control according to the second embodiment is adaptable to the protocol using negative edges.

Third Embodiment

Figure 7:
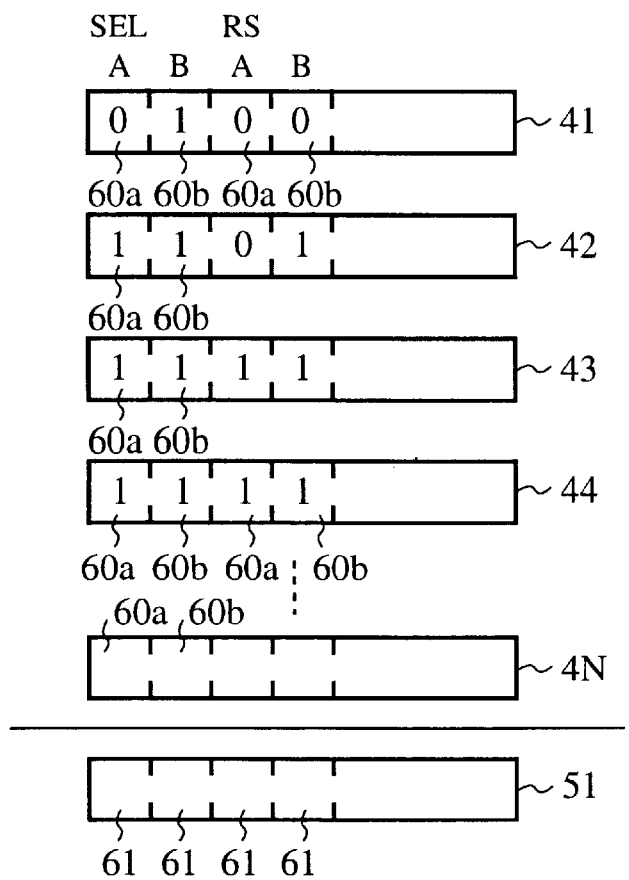
FIG. 7 is a block diagram showing a construction of a system-to-external bus control buffer register of a control circuit according to a third embodiment of the present invention.
Figure 8:
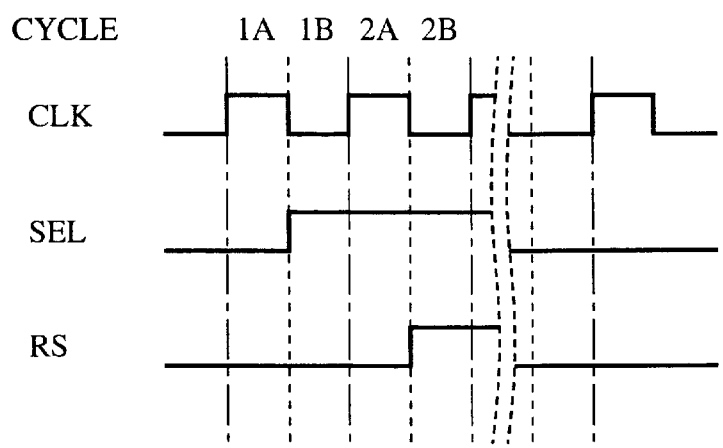
FIG. 8 is a timing chart showing variations in system-to-external bus control signals according to the third embodiment.

In the bus control according to the second embodiment, two cycle registers are assigned to each cycle. Alternatively, one cycle register may be assigned to each cycle such that each register is provided with a first area storing the signal level of the first half cycle and a second area storing the signal of the second half cycle. FIG. 7 is a block diagram showing a construction of a system-to-external bus control buffer register of a bus control circuit according to a third embodiment of the present invention. FIG. 8 is a timing chart showing variations in system-to-external bus control signals according to the third embodiment. In FIGS. 3, 5 and 7, like numerals represent like elements and the description thereof is omitted.

A description will now be given of the operation according to the third embodiment.

It is assumed that the areas 60a in the cycle register 41 corresponding to the SEL signal, the RS signal . . . in the first half cycle of the first cycle hold "0, 0, . . . ", respectively; the areas 60b in the cycle register 41 corresponding to the SEL signal, the RS signal, . . . in the second half cycle of the first cycle hold "1, 0, . . . ", respectively; the areas 60a in the cycle register 42 corresponding to the SEL signal, the RS signal, . . . in the first half cycle of the second cycle hold "1, 0, . . . ", respectively; the areas 60b in the cycle register 42 corresponding to the SEL signal, the RS signal, . . . in the second half cycle of the second cycle of hold "1, 1, . . . ", respectively; . . . and the areas 60a and 60b in the cycle register 4N hold respective levels, in accordance with the protocol required for the connected external device 2. The area 61 in the default register 51 holds the disable signal level of the corresponding signal-to-external bus control signal in a normal state.

As shown in FIG. 8, the levels of the SEL signal, the RS signal, . . . in the first half cycle held in the respective areas 60a in the cycle register 41 are read out in cycle 1A at the rising edge of the clock CLK and output from the output processing unit 36 to the SEL signal line 23a, the RS signal line 23b, . . . constituting the set of control signal line 23 via the system-to-external terminal 31. As a result of this, the SEL signal line 23a is brought to "0" level; and the RS signal line 23b is brought to "0" level. Likewise, in cycle 1B, as a result of reading out the levels of the SEL signal, the RS signal, . . . in the second half cycle from the areas 60b in the cycle register 41 at the falling edge of the clock CLK and outputting the levels thus read out from the output processing unit 36 to the SEL signal line 23a, the RS signal line 23b, . . . constituting the set of control signal line 23 via the system-to-external terminal 31, the SEL signal line 23a is brought to "1" level; and the RS signal line 23b is brought to "0" level.

Likewise, in cycle 2A, as a result of reading out the levels in the first half cycle from the areas 60a in the cycle register 42 at the rising edge of the clock CLK, the SEL signal line 23a is brought to "1" level; and the RS signal line 23b is brought to "0" level. In cycle 2B, as a result of reading out the levels in the second half cycle from the areas 60b in the cycle register 42, the SEL signal line 23a is brought to "1" level; and the RS signal line 23b is brought to "1" level.

Thus, for each of the cycles 1–N, the contents of the areas 60a of the cycle registers 4l–4N are read out at the rising edge of the clock CLK and the contents of the areas 60b of the cycle registers 4l–4N are read out at the falling edge of the clock CLK. The contents (signal levels) thus read out are output from the output processing unit 36 to the corresponding ones of the SEL signal line 23a, the RS signal line 23b, . . . , via the system-to-external terminal 31. Thus, the signal levels of the system-to-external control signals in the first half cycle of each cycle are output to the set of control signal lines 23 at the rising edge of the clock CLK; and the signal levels of the system-to-external control signals in the second half cycle of each cycle are output to the set of control signal lines 23 at the falling edge of the clock CLK. After the NBth cycle, the signal levels stored in the areas 61 in the default register 51 are respectively output from the output processing unit 36 to the SEL signal line 23a, the RS signal line 23b, . . . , via the system-to-external terminal 31.

As described, according to the third embodiment, the system-to-external bus control signal is output at the rising edge and the falling edge of the clock CLK without increasing the number of cycle registers. Thus, the bus control according to the third embodiment is adaptable to the protocol using negative edges.

Fourth Embodiment

Figure 9:
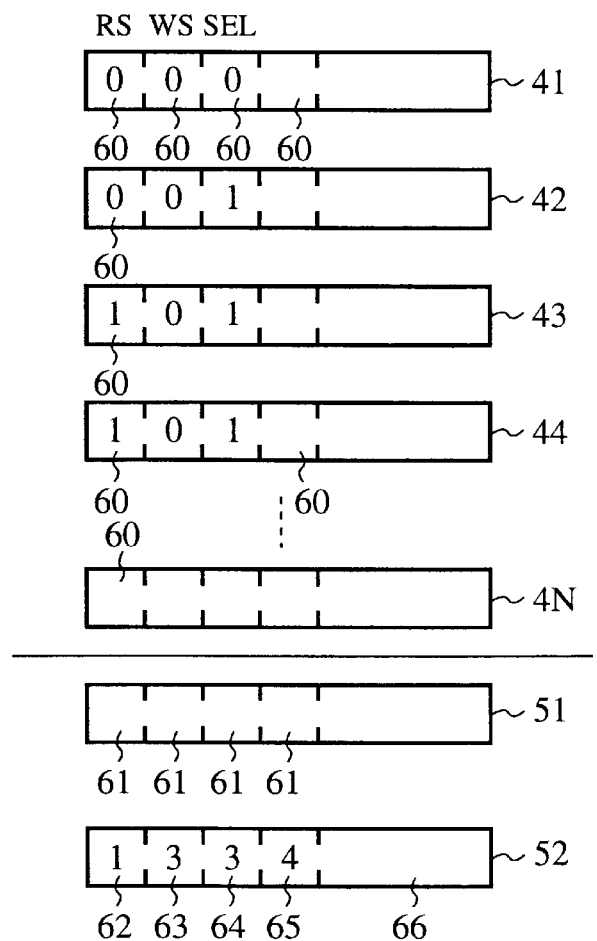
FIG. 9 is a block diagram showing a construction of a system-to-external bus control buffer register of a bus control circuit according to a fourth embodiment of the present invention.
Figure 10:
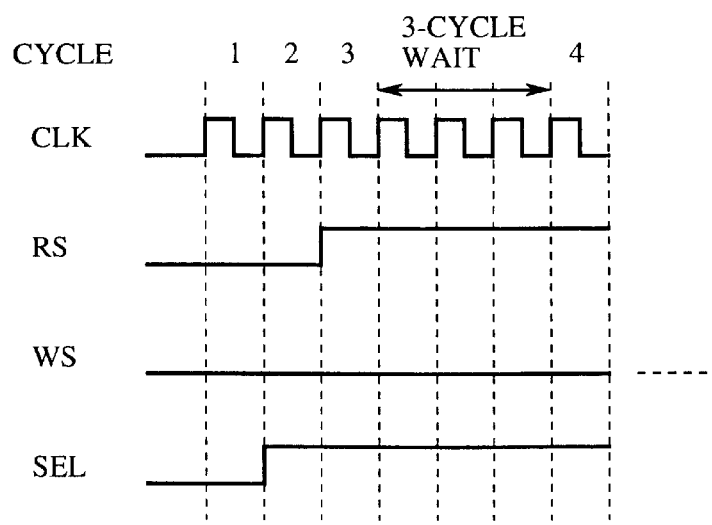
FIG. 10 is a timing chart of system-to-external bus control signals according to the fourth embodiment.

A description will now be given of a fourth embodiment according to the present invention. FIG. 9 is a block diagram showing a construction of a system-to-external bus control buffer register of a bus control circuit according to the fourth embodiment. FIG. 10 is a timing chart of system-to-external bus control signals according to the fourth embodiment. Those components of FIG. 9 that are identical to the corresponding components of the first embodiment are designated by the same numerals so that the description thereof is omitted.

Referring to FIG. 9, reference numeral 52 indicates a control register provided in the system-to-external bus control buffer register, for holding control information for controlling the timing of output from the cycle registers 4l–4N. The control register 52 comprises an area 62 for holding WAIT ENABLE/DISABLE data indicating whether the level of the system-to-external control signal held in the corresponding area 60 in the cycle registers 4l–4N should wait before being output; an area 63 for holding WAIT TIMES data indicting the number of cycles in which the system-to-external control signal should wait, i.e., indicating the duration of the wait; an area 64 for holding a start point in the bus cycles at which point the wait should start; an area 65 for holding an end point in the bus cycles to which point a jump should occur after the wait; and an area 66 for holding a content of an event.

A description will now be given of the operation according to the fourth embodiment.

It is assumed that the areas 60 in the cycle registers 4l–4N hold the same signal levels as in the first embodiment and the areas 61 in the default register 51 hold the same signal levels as in the first embodiment. The area 62 of the control register 52 holds the WAIT ENABLE/DISABLE data "1" indicating that the WAIT ENBLE is asserted. The area 63 holds data "3" indicating the wait should continue for three cycles. The area 64 holds data "3" indicating that the third cycle is designated as the start point. The area 65 holds data "4" indicating that the fourth cycle is designated as the endpoint.

The cycle-by-cycle output of the system-to-external bus control signal levels from the registers 4l–4N and the output of the system-to-external bus control signal levels from the default register 51 after the N cycles are the same as the corresponding operations of the first embodiment so that the description thereof is omitted.

As has been described, the WAIT ENABLE/DISABLE data indicates that the WAIT ENABLE is asserted, the WAIT TIMES data indicates that the wait should continue for three cycles, the third cycle is designated as the start point and the fourth cycle is designated as the end point. Under this condition, as shown in FIG. 10, the signal levels of the system-to-external control signals are output to the set of control signal lines 23 comprising the RS signal line 23b, the SEL signal line 23a and the WS signal line 23c, from the first through third cycles. Since the start point held in the area 64 in the control register 52 indicates that a wait should be imposed in the third cycle so that the signal level in the third cycle continues to be output to the set of control signal lines 23.

The signal level is maintained for additional three cycles pursuant to the WAIT TIMES data held in the area 63 in the control register 52. When the three cycles expire so that the wait is cancelled, the signal levels of the system-to-external bus control signals in the fourth and subsequent cycles are output to the set of control signal lines 23 comprising the RS signal line 23b, the WS signal lines 23c and the SEL signal line 23a, in accordance with the endpoint held in the area 65 in the control register 52. Subsequently, the signal levels of the system-to-external bus control signals are output successively for each cycle.

As has been described, according to the fourth embodiment, it is possible to impose a wait on the output of the system-to-external bus control signals to the set of control signal lines 23, using an external ready signal (READY) or an internal soft wait signal. The control of the system-to-external bus 3 according to the fourth embodiment -is also applicable to a system-to-external bus control protocol using the number of cycles other than N. Even with the limited number of cycle registers 41, 42, 43, . . . , the system-to-external bus control adapted to the required protocol is effected.

Fifth Embodiment

Figure 11:
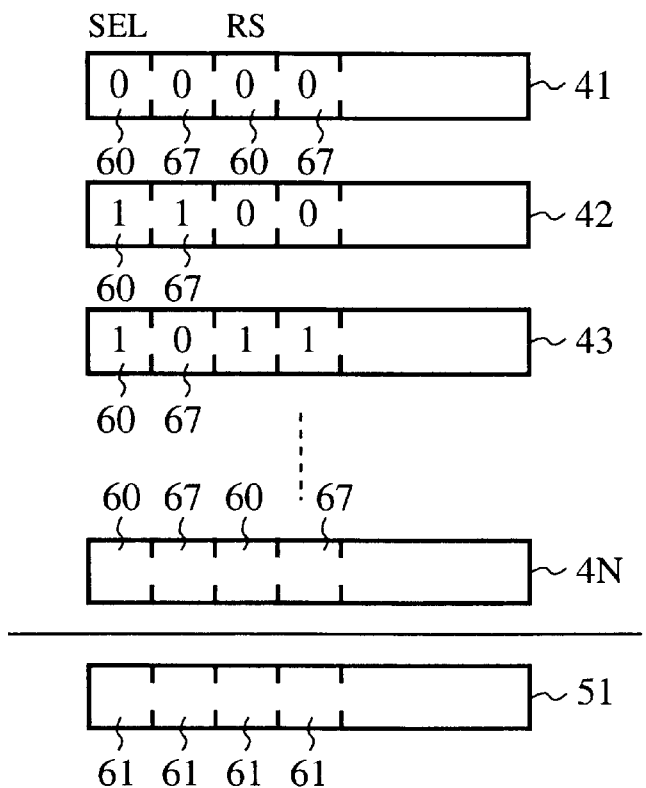
FIG. 11 is a block diagram showing a construction o a system-to-external bus control buffer register of a bus control circuit according to a fifth embodiment the present invention.
Figure 12:
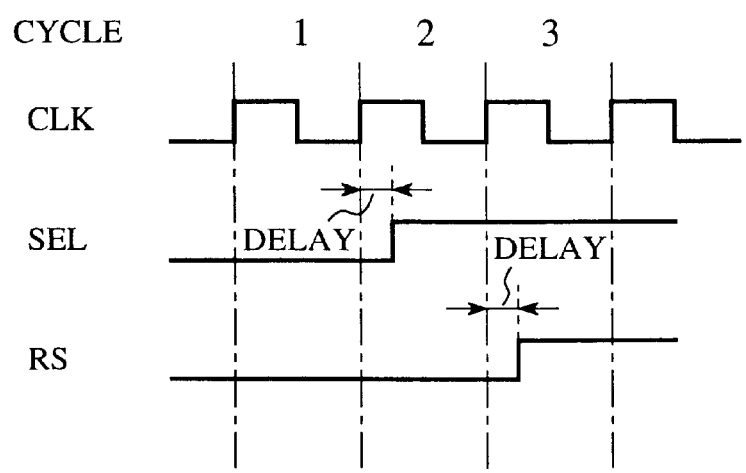
FIG. 12 is a timing chart of system-to-external bus control signals according to the fifth embodiment.

A description will now be given of a fifth embodiment of the present invention. FIG. 11 is a block diagram showing a construction of a system-to-external bus control buffer register of a bus control circuit according to the fifth embodiment. FIG. 12 is a timing chart of system-to-external bus control signals according to the fifth embodiment. Those components of FIG. 11 that are identical to the corresponding components of the first embodiment are designated by the same numerals of FIG. 3 so that the description there is omitted.

Referring to FIG. 11, reference numeral 67 indicates a delay information area provided in association with each of the areas 60 in the cycle registers 4l–4N holding the cycle-by-cycle signal levels of the system-to-external bus control signals, for storing delay information defining a delay of the output of the corresponding system-to-external bus control signal level to the SEL signal line 23a, the RS signal line 23b or the like.

A description will now be given of the operation according to the fifth embodiment.

It is assumed herein that the areas 60 in the cycle registers 4l–4N and the area 61 in the default register 51 store the same signal levels as in the example discussed the first embodiment. It is further assumed that the delay information area 67 associated with the area 60 in the cycle register 42 holding the signal level of the SEL signal stores the delay information "1", the delay information area 67 associated with the area 60 in the cycle register 43 holding the signal level of the RS signal stores the delay information "1" and the other delay information areas 67 store the delay information "0".

The delay information indicates whether the signal level of the corresponding system-to-external bus control signal should be delayed by a predetermined period of time, where "1" indicates that the delay is imposed and "0" indicates that the delay is not imposed. By increasing the number of bits assigned to the delay information area 67, it is possible to set delay time as well as the provision and non-provision thereof.

The cycle-by-cycle output of the system-to-external bus control signal levels from the registers 4l–4N and the output of the system-to-external bus control signal levels from the default register 51 after the N cycles are the same as the corresponding operations of the first embodiment so that the description thereof is omitted.

Since the delay information held in the delay information areas 67 in the cycle register 41 is "0", the SEL signal and the RS signal are not delayed, as shown in FIG. 12, before being output to the SEL signal line 23a and the RS signal line 23b, respectively. In the second cycle, since the delay information held in the delay information area 67 in the cycle register 42 corresponding to the SEL signal is "1", only the SEL signal is delayed by a predetermined period of time before being output to the SEL signal line 23a. The signal level of the RS signal is not delayed before being output to the RS signal line 23b. In the third cycle, since the delay information held in the delay information area 67 in the cycle,register 43 corresponding to the RS signal is "1", only the RS signal is delayed by a predetermined period of time before being output to the RS signal line 23b. The signal level of the SEL signal is not delayed before being output to the SEL signal line 23a.

The delay information stored in the delay information areas 67 in the cycle registers 4l–4N are rewritable. By rewriting the delay information, the delay imposed on the SEL signal, the RS signal and the like output to the SEL signal line 23a, the RS signal line 23b and the like, respectively, is controlled in a programmable manner in response to the protocol required for the system-to-external bus control protocol.

As has been described, according to the fifth embodiment, it is not only possible to generate the system-to-external bus control signal in a programmable manner but also to set a delay in the system-to-external bus control signal cycle by cycle. Therefore, even when the signal is improperly timed due to the capacity derived from wiring for connection to the external device 2, the improper timing is corrected by sophisticated control according to the fifth embodiment. By constructing the delay information area 67 with a plurality of bits, the delay time of the control signal is variable from cycle to cycle, thereby providing even more sophisticated timing control.

Sixth Embodiment

Figure 13:
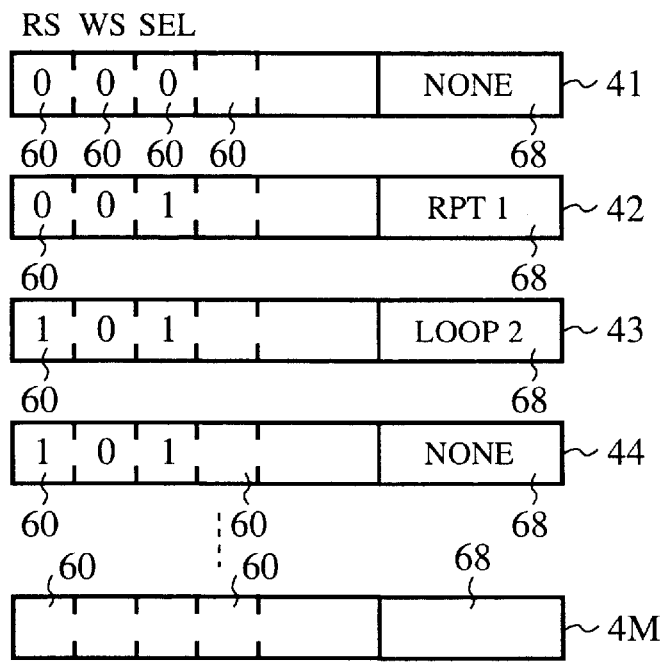
FIG. 13 is a block diagram showing a construction of system-to-external bus control buffer register of a bus control circuit according to a sixth embodiment of the present invention.
Figure 14:
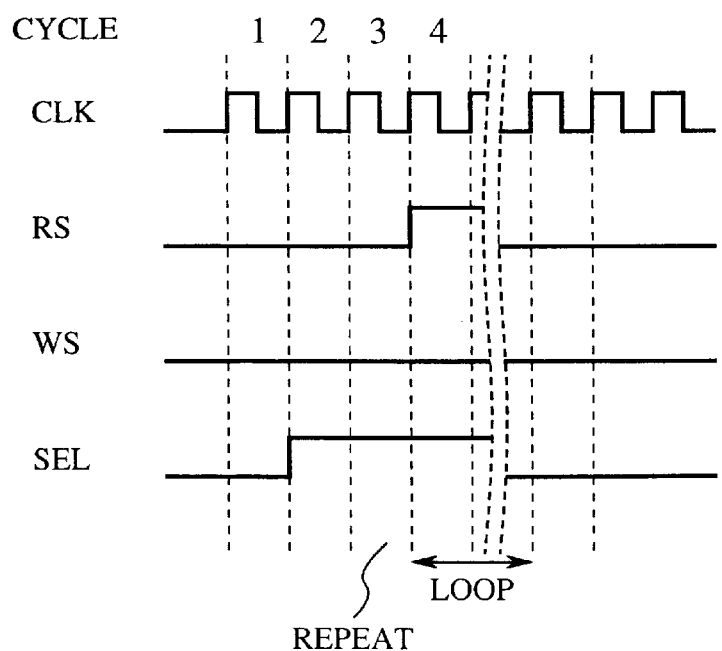
FIG. 14 is a timing chart of system-to-external bus control signals according to the sixth embodiment.

A description will now be given of a sixth embodiment according to the present invention. FIG. 13 is a block diagram showing a construction of a system-to-external bus control buffer register of a bus control circuit according to the sixth embodiment. FIG. 14 is a timing chart of system-to-external bus control signals according to the sixth embodiment. Those components of FIG. 13 that are identical to the corresponding components are designated by the same reference numerals of FIG. 3 so that the description thereof is omitted.

Referring to FIG. 13, reference numeral 68 indicates an instruction field for holding instructions including RPT (repeat), LOOP and IF, indicating how the system-to-external bus control signal is output. The number M of cycle registers 41-4M is smaller than the number N of bus cycles occurring on the system-to-external bus 3.

A description will now be given of the operation according to the sixth embodiment.

It is assumed herein that the areas 60 in the cycle registers 41–44 hold the same signal levels as the cycle registers 41–44 of the first embodiment. The instruction field 68 of the cycle register 42 stores "RPT1", the instruction field 68 of the cycle register 43 stores "LOOP2", and the instruction fields 68 of the cycle register 41 and the cycle register 44 do not store any instruction designating the method of output (NONE state).

The output of the system-to-external bus control signal levels from the cycle registers 41–4M is the same as the corresponding operation according to the first embodiment so that the description thereof is omitted.

In the first cycle, the content of the cycle register 41 is read out. Since the instruction field 68 of the cycle register 41 is in the NONE state (i.e., does not store any instruction), the RS signal, the WS signal and the SEL signal stored in the corresponding areas 60 in the cycle register 41 are output transparently to the RS signal line 23b, the WS signal line 23c and the SEL signal line 23a, respectively.

In the second cycle, the content of the cycle register 42 is read out so that the signal levels of the RS signal, the WS signal and the SEL signal stored in the corresponding areas 60 are output to the RS signal line 23b, the WS signal line 23c and the SEL signal line 23a, respectively. Since the instruction field 68 in the cycle register 42 stores the repeat instruction "RPT1", the output of signal levels of the RS signal, the WS signal and the SEL signal stored in the corresponding areas 60 in the cycle register 42 to the RS signal line 23b, the WS signal line 23c and the SEL signal line 23a, respectively, is repeated by a number of time indicated by the repeat instruction "RPT1" (in the case of FIG. 14, repeated once).

In the fourth cycle, the content of the cycle register 43 is read out so that the signal levels of the RS signal, the WS signal and the SEL signal stored in the corresponding areas 60 are output to the RS signal line 23b, the WS signal line 23c and the SEL signal line 23a, respectively. Since the instruction field 68 in the cycle register 43 stores the loop instruction "LOOP2", a loop of cycles ending with the loop end cycle specified by the loop instruction "LOOP2" is repeated by a number of times specified by the loop instruction "LOOP2". The output of the signal levels of the RS signal, the WS signal and the SEL signal to the RS signal line 23b, the WS signal line 23c and the SEL signal line 23a is repeated accordingly. In FIG. 14, illustration of the RS signal, the WS signal, the SEL signal and the clock CLK in the fifth and subsequent cycles of the loop is omitted.

As has been described, according to the sixth embodiment, the number of cycle registers 41–4M used to generate the system-to-external bus control signals adapted to the protocol required for the system-to-external bus control may be smaller than the number of bus cycles N. Accordingly, useful benefits including reduction in circuit size and power consumption are available.

Seventh Embodiment

Figure 15:
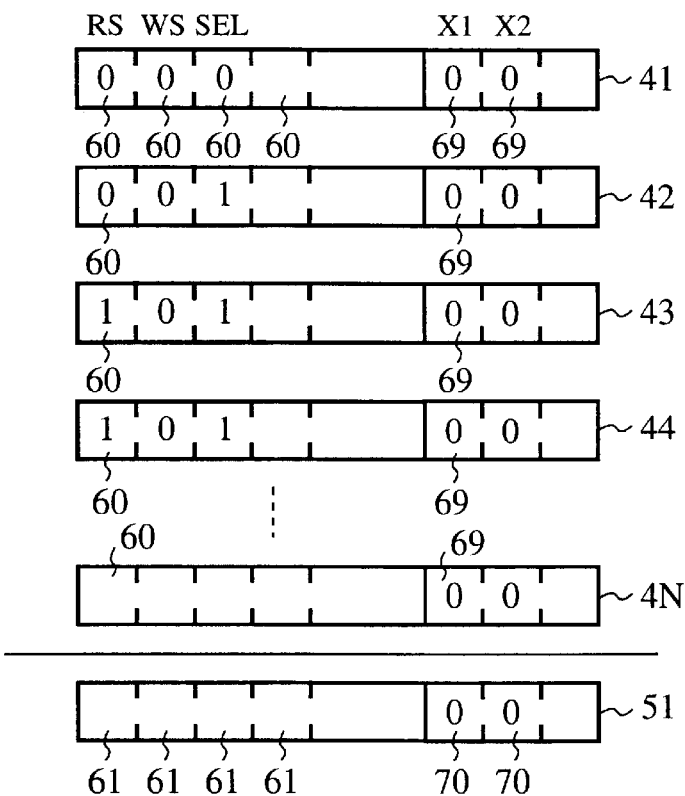
FIG. 15 is a block diagram showing a construction of a system-to-external bus control buffer register of a bus control circuit according to a seventh embodiment of the present invention.
Figure 16:
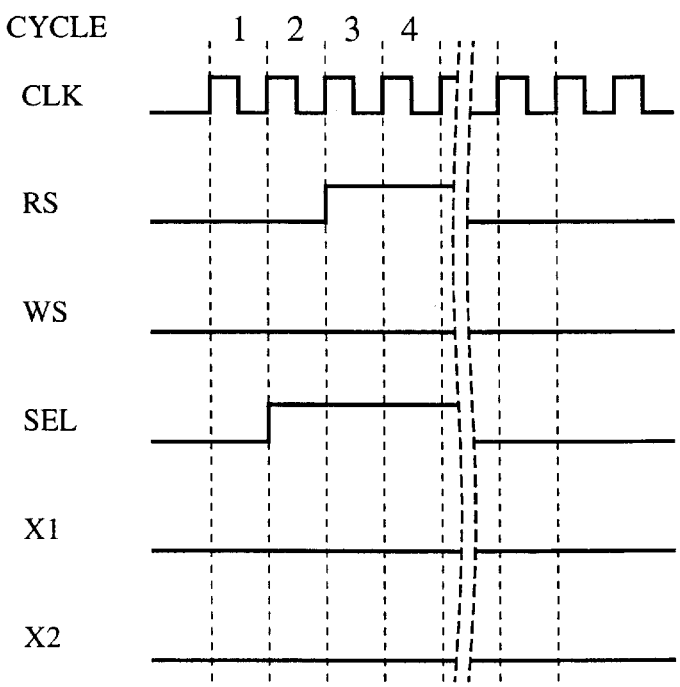
FIG. 16 a timing chart of system-to-external bus control signals according to the seventh embodiment.

A description will now be given of a seventh embodiment according to the present invention. FIG. 15 is a block diagram showing a construction of a system-to-external bus control buffer register of a bus control circuit according to the seventh embodiment. FIG. 16 is a timing chart of system-to-external bus control signals according to the seventh embodiment. Those components of FIG. 15 that are identical to the corresponding components of the first embodiment shown in FIG. 3 are designated by the same numerals so that the description thereof is omitted.

Referring to FIG. 15, reference numeral 69 indicates an area provided in each of the cycle registers 4l–4N to hold a signal level of undefined general-purpose signals X1, X2 or the like for the corresponding cycle; and reference numeral 70 indicates an area provided in the default register 51 to hold a signal level of the undefined general-purpose signals X1, X2 or the like in a normal state.

A description will now be given of the operation according to the seventh embodiment.

It is assumed herein that the areas 60 of the cycle registers 4l–4N and the area 61 of the default register 51 store the same signal levels as the corresponding areas in the cycle registers 4l–4N and the default register 51 according to the first embodiment. It is also assumed that the undefined areas 69 of the cycle registers 4l–4N and the area 70 of the default register 51 store "0".

The output of the signal levels of the system-to-external bus control signals from the registers 4l–4N according to the seventh embodiment is the same as the corresponding operation in the first embodiment so that the description thereof is omitted.

As shown in FIG. 16, the signal levels of the RS signal, the WS signal and the SEL signal held in the areas 60 in the cycle register 41 are read out and output to the RS signal line 23b, the WS signal line 23c and the SEL signal line 23a constituting the set of control signal lines 23. Concurrently, the signal levels of the undefined general-purpose signals X1 and X2 held in the areas 69 in the cycle register 41 are also read out and output to the corresponding X1 signal line and the X2 signal line (not shown), respectively. As a result of this, the RS signal line 23b, the WS signal line 23c, the SEL signal line 23a, the X1 signal line and the X2 signal line are brought to "0" level.

Likewise, in the second and subsequent cycles, as a result of the signal levels being read out from the areas 60 and the areas 69 of the cycle register 42, the RS signal line 23b, the WS signal line 23c, the SEL signal line 23a, the X1 signal line and the X2 signal line are brought to "0", "0", "1", "0" and "0", respectively. In the third cycle, as a result of the signal levels being read out from the areas 60 and the areas 69 of the cycle register 43, the RS signal line 23b, the WS signal line 23c, the SEL signal line 23a, the X1 signal line and the X2 signal line are brought to "1", "0", "1", "0" and "0", respectively. After N cycles, the signal levels stored in the areas 61 and areas 70 of the default register 51 are output from the output processing unit 36 to the SEL signal line 23a, the RS signal line 23b, the WS signal line 23c, the X1 signal line and the X2 signal line via the system-to-external terminal 31.

While it is assumed in the above that the undefined general-purpose signals X1 and X2 are output via the X1 signal line and the X2 signal line, respectively, the output processing unit 36 of FIG. 2 may disable the output thereof if these signals are unused.

As described, according to the seventh embodiment, the system-to-external bus control signals are generated in a programmable manner. In further accordance with the seventh embodiment, any system-to-external bus control signal additionally found to be required after the system has been developed may be assigned to the undefined general-purpose signal so that the system is adapted to the post-development revision without redesigning.

Eighth Embodiment

Figure 17:
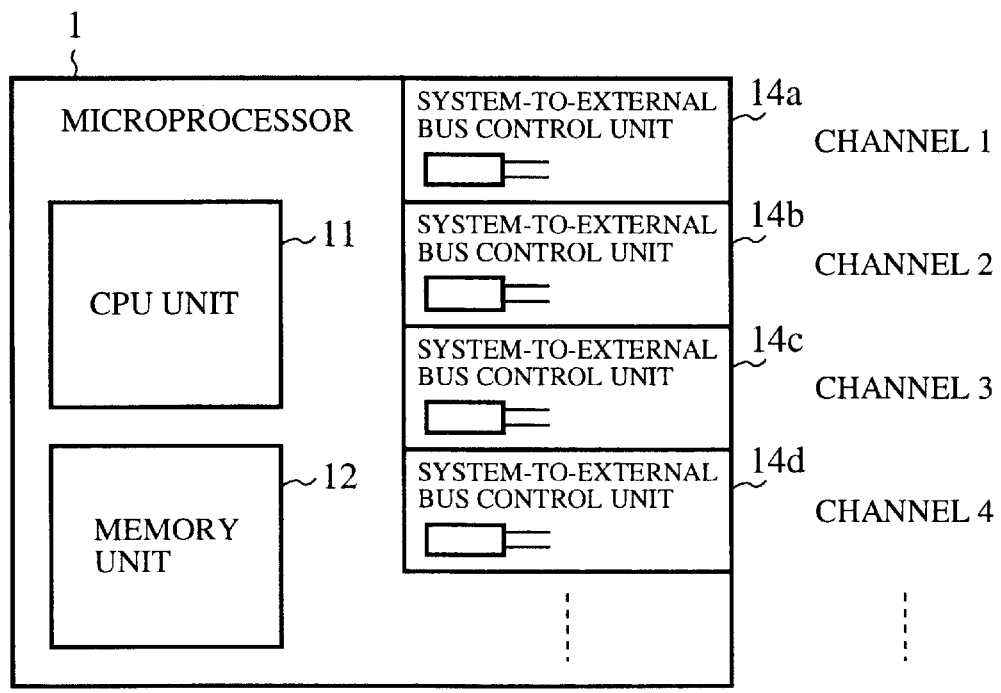
FIG. 17 is a block diagram showing a construction construction of a semiconductor device in which a bus control circuit according to an eighth embodiment of the present invention is used.

A description will now be given of an eight embodiment according to the present invention. FIG. 17 is a block diagram showing a construction of a semiconductor device in which a bus control circuit according to the eighth embodiment is used. Referring to FIG. 17, the microprocessor 1 (semiconductor device) comprises the CPU unit 11, the memory unit 12, a plurality of system-to-external bus control units 14a, 14b, 14c, 14d, . . . provided in the microprocessor 1 for respective channels. Each of the system-to-external bus control units 14a, 14b, 14c, 14d, . . . is provided with the bus control circuit according to any of the first through seventh embodiments.

By assigning the function of the bus control circuit according to any of the first through seventh embodiments to each of the system-to-external bus control units 14a, 14b, 14c, 14d, . . . provided for respective channels, the address areas thereof are utilized for adaptation to the specific protocol.

Various advantages provided by the present invention will now be summarized.

In accordance with the invention, the signal levels of the system-to-external bus control signals stored in the corresponding areas in the cycle registers provided for respective cycles are output cycle by cycle. When the normal state takes over, the signal level of the system-to-external bus control signals in the normal state stored in the corresponding areas in the default register are output. Therefore, a bus control circuit, in which generation of the system-to-external bus control signals adapted to the protocol required for the system-to-external bus control is programmable, results.

In further accordance with the invention, the cycle-by-cycle signal levels of the system-to-external bus control signals are held in the corresponding areas in the cycle registers and output cycle by cycle. Therefore, generation of the signal levels of the system-to-external bus control signals adapted to the protocol required for the system-to-external bus control is programmable.

The system-to-external bus control signal levels for respective half cycles are stored in the corresponding areas in the cycle registers and output half cycle by half cycle. Therefore, output of the system-to-external bus control signal could occur at the rising and falling edge of the clock. Bus control according to this is adapted to the system-to-external bus control protocol requiring the use of negative edges.

In further accordance with the invention, two cycle registers are provided for each cycle. The areas in one of the cycle registers stores the signal levels in the first half cycle and the other of the cycle registers stores the signal levels in the second half cycle. Therefore, the system-to-external bus control signals are output from cycle registers of a small size at both edges of the clock.

In further accordance with the invention, each cycle register is provided with two areas for each cycle, one of which stores the signal level of the system-to-external bus control signal in the first half cycle and the other of which stores the signal level of the system-to-external bus control signal in the second half cycle. Thus, the system-to-external bus control signal is output at both edges of the clock without increasing the number of cycle registers.

In still further accordance with the invention, the signal level of the system-to-external bus control signal held in the cycle register is output in accordance with control information held in the control register. Therefore, the external ready signal or the internal soft wait signal may be used to impose a wait on the output of the system-to-external bus control signal to the RS signal line, the WS signal line and the SEL signal line. Moreover, the system-to-external bus control protocol using the number of cycles different from the number of cycle registers is processed; i.e., the protocol may be processed using a relatively smaller number of cycle registers.

In still further accordance with the invention, the output of the system-to-external bus control signal is delayed in accordance with the delay information stored in the delay information area provided in association with the area for storing the signal level. Therefore, it is not only possible to generate the system-to-external bus control signal in a programmable manner but also to delay the system-to-external bus control signal cycle by cycle. Even when the signal is improperly timed due to the capacity derived from wiring for connection to the external device, the improper timing is corrected by sophisticated control.

In still further accordance with the invention, the signal level of the system-to-external bus control signal held in the corresponding area is output in accordance with the method of output specified by the instruction stored in the instruction field in the cycle register. Therefore, the system-to-external bus control signal adapted to the protocol is generated using the number of cycle registers smaller than the number of bus cycles. Accordingly, the circuit scale and the power consumption are reduced.

In still further accordance with the invention, the area for the undefined signal is reserved in the cycle register. The signal level of the undefined general-purpose signal is output in addition to the signal levels of the system-to-external bus control signals. Thus, it is not only possible to generate the system-to-external bus control signals in a programmable manner but also to adapt to addition of extra system-to-external bus control signals without redesigning, by assigning the system-to-external bus control signal added as a result of new development to the undefined general-purpose signal.

The present invention is not limited to the above-described embodiments, and variations and modifications may be made without departing from the scope of the present invention.

What is claimed is:

1. A bus control circuit for use in a semiconductor device communicating with an external device via a system-to-external bus, for effecting timing control of the system-to-external bus, comprising:

cycle registers provided for respective cycles that occur during communication with the system-to-external bus and provided with signal level areas for holding signal levels of respective system-to-external bus control signals; and a default register provided with normal level areas each holding a signal level of the corresponding system-to-external bus control signal in a normal state, wherein the signal levels of the system-to-external bus control signals held in the corresponding signal level areas in said cycle registers are output according to a predetermined schedule demanded by an arrangement of the signal level areas, and the signal levels of the system-to-external bus control signals held in the corresponding normal level areas in the default register are output when the normal state takes over.

2. The bus control circuit according to claim 1, wherein each of the signal level areas in the corresponding cycle register holds the signal level of the system-to-external bus control signal in one cycle, and the signal levels of the system-to-external bus control signals held in the corresponding signal level areas in the cycle registers are output cycle by cycle during the communication.

3. The bus control circuit according to claim 1, wherein each of the signal level areas in the corresponding cycle register holds the signal level of the system-to-external bus control signal in a half cycle, and the signal levels of the system-to-external bus control signals held in the corresponding signal level areas in the cycle registers are output half cycle by half cycle during the communication.

4. The bus control circuit according to claim 3, wherein two cycle registers are provided for each cycle that occurs during the communication, the signal level areas in one of the two cycle registers holding the signal levels in a first half cycle and the signal level areas in the other of the two cycle registers holding the signal levels in a second half cycle.

5. The bus control circuit according to claim 3, wherein, in each of the cycle registers responsible for respective cycles, two signal level areas are provided to correspond to the corresponding system-to-external bus control signal, one of the two signal level areas holding the signal level in a first half cycle and the other of the two signal level areas holding the signal level in a second half cycle.

6. The bus control circuit according to claim 1, further comprising a control register for holding information for controlling timing of output from the cycle registers, wherein the signal levels held in the corresponding signal level areas in the cycle registers are output in accordance with the information held in said control register.

7. The bus control circuit according to claim 1, wherein a delay information area for holding delay information specifying a delay to be imposed on the corresponding signal level is provided for each of the signal level areas in the corresponding cycle register, so that each of the signal levels of the corresponding system-to-external bus control signal held in the corresponding signal level area is delayed, before being output, in accordance with the delay information held in the corresponding delay information area.

8. The bus control circuit according to claim 1, wherein each of the cycle registers is provided with an instruction field for holding an instruction specifying a method of output of the corresponding signal levels, so that the signal levels of the system-to-external bus control signals held in the signal level areas in the corresponding cycle register are output in accordance with the method of output specified by the instruction held in the instruction field.

9. The bus control circuit according to claim 1, wherein each of the cycle registers and the default register is provided with undefined signal areas for holding the signal levels of undefined general-purpose signals, so that the signal levels of the general purpose signals held in the undefined signal areas are output in addition to the signal levels of the system-to-external bus control signals held in the signal level areas.

* * * * *